(12) United States Patent
Sasaki

(10) Patent No.: US 9,650,486 B2
(45) Date of Patent: May 16, 2017

(54) POLYOLEFIN RESIN PARTICLES, POLYOLEFIN RESIN FOAMED PARTICLES, AND METHOD FOR PRODUCING POLYOLEFIN RESIN FOAMED PARTICLES

(71) Applicant: JSP Corporation, Tokyo (JP)

(72) Inventor: Hidehiro Sasaki, Tochigi (JP)

(73) Assignee: JSP Corporation, Tokyo (JP)

(*) Notice: Subject to any disclaimer, the term of this patent is extended or adjusted under 35 U.S.C. 154(b) by 0 days.

(21) Appl. No.: 15/111,150

(22) PCT Filed: Jan. 13, 2015

(86) PCT No.: PCT/JP2015/050694
§ 371 (c)(1),
(2) Date: Jul. 12, 2016

(87) PCT Pub. No.: WO2015/108040
PCT Pub. Date: Jul. 23, 2015

(65) Prior Publication Data
US 2016/0333162 A1    Nov. 17, 2016

(30) Foreign Application Priority Data

Jan. 14, 2014    (JP) .................................. 2014-004184

(51) Int. Cl.
*C08J 9/18*    (2006.01)
(52) U.S. Cl.
CPC ............ *C08J 9/18* (2013.01); *C08J 2205/044* (2013.01); *C08J 2205/052* (2013.01); *C08J 2207/00* (2013.01); *C08J 2323/14* (2013.01)
(58) Field of Classification Search
CPC ................................................ C08J 9/16–9/20
See application file for complete search history.

(56) References Cited

U.S. PATENT DOCUMENTS 4,704,239 A * 11/1987 Yoshimura .......... B29C 44/3461
                                                                   264/50
5,942,551 A * 8/1999 Ichimura ................ C08J 9/0061
                                                                   521/58
(Continued)

FOREIGN PATENT DOCUMENTS

JP        H03-2890 B2      1/1991
JP      2000-327826 A     11/2000
(Continued)

OTHER PUBLICATIONS

Machine translation of JP 2007-015228 by Oikawa et al.*
International Search Report date of mailing Apr. 14, 2015 for PCT/JP2015/050694 and English translation of the same (6 pages).

*Primary Examiner* — Mike M Dollinger
*Assistant Examiner* — Christina Wales
(74) *Attorney, Agent, or Firm* — Fitch, Even, Tabin & Flannery LLP

(57) ABSTRACT

The present invention provides polyolefin resin particles that are capable of producing expanded polyolefin resin beads having a favorable fine cell structure, expanded polyolefin resin beads that suffer less volume shrinkage under a high temperature environment and are excellent in recovery property on repeated compression, and a method for producing the expanded beads. The polyolefin resin particles of the present invention have a peak temperature ($T_1$) of a melting peak on first heating in a DSC curve obtained by heating the resin particles from 20° C. to 200° C. at a heating rate of 10° C./min that is higher by 1.5° C. or more than a peak temperature ($T_2$) of a melting peak on second heating in a DSC curve obtained by, subsequent to the first heating, cooling the resin particles from 200° C. to 20° C. at a cooling rate of 10° C./min, and then heating the resin particles from 20° C. to 200° C. at a heating rate of 10° C./min. The method for producing expanded polyolefin resin beads of the present (Continued)

invention includes: a step of preparing preliminary resin particles containing a polyolefin resin; a step of heat-treating the preliminary resin particles at a temperature that is higher by from 15 to 25° C. than a melting point of the preliminary resin particles, so as to produce resin particles; and a step of expanding the resin particles.

5 Claims, 3 Drawing Sheets

(56) References Cited

U.S. PATENT DOCUMENTS

| 6,051,617 | A | * | 4/2000 | Sasaki | C08F 255/02 521/139 |
|---|---|---|---|---|---|
| 2010/0105787 | A1 | | 4/2010 | Sasaki et al. | |

FOREIGN PATENT DOCUMENTS

| JP | 2003-246864 A | 9/2003 |
|---|---|---|
| JP | 2005-225227 A | 8/2005 |
| JP | 2007-015228 A | 1/2007 |
| JP | 2011-74239 A | 4/2011 |
| JP | 2012-040787 A | 3/2012 |
| WO | 2009/001626 A1 | 12/2008 |

* cited by examiner

POLYOLEFIN RESIN PARTICLES, POLYOLEFIN RESIN FOAMED PARTICLES, AND METHOD FOR PRODUCING POLYOLEFIN RESIN FOAMED PARTICLES

CROSS-REFERENCE TO RELATED APPLICATIONS

This application is a U.S. national phase application filed under 35 U.S.C. §371 of International Application PCT/JP2015/050694, filed on Jan. 13, 2015, designating the United States, which claims priority from Japanese Application Number 2014-004184, filed Jan. 14, 2014, which are hereby incorporated herein by reference in their entirety.

TECHNICAL FIELD

The present invention relates to polyolefin resin particles, expanded polyolefin resin beads produced by expanding the polyolefin resin particles, and a method for producing the expanded polyolefin resin beads.

BACKGROUND ART

A beads cushion having fine expanded beads filled in a bag formed of a stretch fabric is applied to various articles, such as a body pillow, a bottom mattress, a bed mattress, a comforter, a sound sleep pillow, an automotive interior material, a foot supporter, a personal floatation device, winter clothes, and furniture. It has been confirmed that the comfort of the beads cushion depends on the stretchability of the fabric and the particle diameter of the expanded beads, and in particular, the comfort of the beads cushion and the like materials is enhanced with smaller expanded beads. The known expanded beads that are capable of being applied to the beads cushion include expanded polystyrene resin beads described in PTL 1. The expanded beads described in PTL 1 are minute and are capable of enhancing the comfort of the beads cushion. As described in PTL 2, a method for producing minute expanded beads formed of a thermoplastic resin, such as a polypropylene resin, as a base resin has been known.

CITATION LIST

Patent Literatures

PTL 1: JP-A-2011-74239
PTL 2: JP-A-2005-225227

SUMMARY OF INVENTION

However, some issues have been pointed out on the beads cushion using the expanded polystyrene resin beads. One of the issues is settling of the expanded beads, and another one of them is volume shrinkage of the expanded beads under a high temperature environment. The settling is such a phenomenon that the expanded beads are compressed and stay at that state. The phenomenon occurs due to the repeated occurrence of volume change of the expanded beads on application of a load to the beads cushion. In particular, due to the high brittleness of the polystyrene resin among thermoplastic resins, the expanded polystyrene resin beads are liable to suffer elastic deformation of the foam cell film and breakage of the foam cells, and are particularly liable to suffer settling, on application of excessive compression or repeated compression for a prolonged period of time.

The volume shrinkage under a high temperature environment occurs due to deformation shrinkage of the base material resin of the expanded beads, dissipation of gases from the foam cells of the expanded beads, and the like, when the expanded beads are placed under a high temperature environment. The polystyrene resin has a glass transition temperature around 100° C., and therefore in the case where a beads cushion using expanded polystyrene resin beads is used as a nursing care bed mattress, or the like, the expanded beads may suffer volume shrinkage on cleaning the nursing care bed mattress by steam sterilization, boiling sterilization or the like, in some cases.

It has been known that a polyolefin resin has better ductility than a polystyrene resin and has a high heat distortion temperature, and expanded polyolefin resin beads are excellent in recovery property on compression, dimensional stability at a high temperature, and the like. However, there is a relationship between the foam cell structure of the expanded polyolefin resin beads and the compression recovery property thereof, and sufficient compression recovery property may not be obtained when the number of foam cells of the expanded beads is too small. In the case where the expanded beads have a small particle diameter, the foam cell diameter is necessarily smaller when the number of foam cells on the cross section of the expanded beads is intended to be increased. Therefore, for providing sufficient compression recovery property in expanded polyolefin resin beads having a small particle diameter, it is necessary to make the foam cells thereof extremely minute. However, it is considerably difficult to control the size of the foam cells in the expanding process, particularly to provide a fine cell structure, since the expansion of the polyolefin resin is completed within a considerably short period of time. Accordingly, it is the current situation that expanded polyolefin resin beads having a fine cell structure with a small particle diameter have not yet been provided.

An object of the present invention is to provide polyolefin resin particles that are capable of producing expanded polyolefin resin beads having a favorable fine cell structure, expanded polyolefin resin beads that are difficult to suffer volume shrinkage and settling under a high temperature environment, and a method for producing the expanded beads.

As a result of earnest investigations made by the present inventors, it has been found that the problems may be solved by using the embodiments shown below, and thus the present invention has been completed.

The present invention includes the following.

(1) Polyolefin resin particles for providing expanded polyolefin resin beads through expansion, having a peak temperature ($T_1$) of a melting peak on first heating in a DSC curve obtained by heating the resin particles from 20° C. to 200° C. at a heating rate of 10° C./min that is higher by 1.5° C. or more than a peak temperature ($T_2$) of a melting peak on second heating in a DSC curve obtained by, subsequent to the first heating, cooling the resin particles from 200° C. to 20° C. at a cooling rate of 10° C./min, and then heating the resin particles from 20° C. to 200° C. at a heating rate of 10° C./min.

(2) The polyolefin resin particles according to the item (1), wherein the polyolefin resin particles are obtained by heat-treating preliminary polyolefin resin particles at a temperature that is higher by from 12 to 25° C. than a melting point of the preliminary polyolefin resin particles.

(3) The polyolefin resin particles according to the item (1) or (2), wherein the polyolefin resin particles have a particle weight of 2,000 μg or less.

(4) The polyolefin resin particles according to any one of the items (1) to (3), wherein the polyolefin resin particles are polypropylene resin particles.

(5) Expanded polyolefin resin beads containing the polyolefin resin particles according to any one of the items (1) to (4) having been expanded, and having two melting peaks in a DSC curve obtained by heating the expanded resin beads from 20° C. to 200° C. at a heating rate of 10° C./min.

(6) The expanded polyolefin resin beads according to the item (5), wherein the expanded polyolefin resin beads have an apparent density of from 10 to 300 g/L, a number of foam cells of from 10 to 50 that cross a straight line passing through a center of the expanded polyolefin resin bead in a longer diameter direction of the expanded bead, an average foam cell diameter of 100 μm or less, and a closed cell ratio of 70% or more.

(7) The expanded polyolefin resin beads according to the item (5) or (6), wherein a polyolefin resin constituting the expanded beads is a polypropylene resin, and a peak temperature (T) of the high temperature side melting peak of the two melting peaks in the DSC curve has a relationship shown by the following expression (1) with respect to a calorific value (ΔH) of the high temperature side melting peak and a peak temperature (Tm) of the low temperature side melting peak:

$$T \geq Tm + 19 - 0.27 \times \Delta H \quad (1)$$

(8) An article containing the expanded polyolefin resin beads according to any one of the items (5) to (7) filled therein.

(9) A method for producing expanded polyolefin resin beads, including: a step of preparing preliminary resin particles containing a polyolefin resin; a step of heat-treating the preliminary resin particles at a temperature that is higher by from 15 to 25° C. than a melting point of the preliminary resin particles, so as to produce resin particles; and a step of expanding the resin particles.

According to the present invention, polyolefin resin particles that are capable of producing expanded polyolefin resin beads having a favorable fine cell structure, expanded polyolefin resin beads that suffer less volume shrinkage under a high temperature environment and are excellent in recovery property on repeated compression, and a method for producing the expanded beads can be provided.

DESCRIPTION OF EMBODIMENTS

Figure 1:
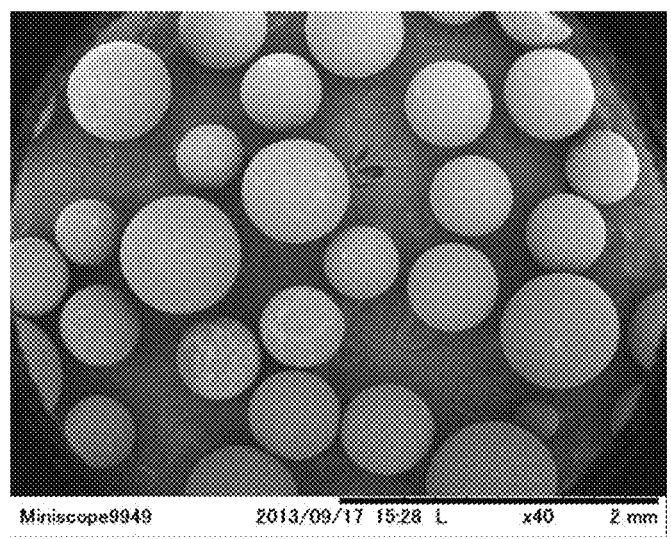
FIG. 1 is a scanning electron micrograph of resin particles of Example 1.

The present inventors have found that a favorable fine cell structure can be formed in expanded beads having a small particle diameter by expanding polyolefin resin particles having a particular crystal structure, and have completed the present invention. Specifically, the polyolefin resin particles of the present invention are polyolefin resin particles that are for providing expanded polyolefin resin beads through expansion, and have such a crystal structure that the peak temperature ($T_1$) of the melting peak on the first heating in the DSC curve obtained by heating the polyolefin resin particles from 20° C. to 200° C. at a heating rate of 10° C./min is higher by 1.5° C. or more than the peak temperature ($T_2$) of the melting peak on the second heating in the DSC curve obtained by, subsequent to the first heating, cooling the resin particles from 200° C. to 20° C. at a cooling rate of 10° C./min, and then heating the resin particles from 20° C. to 200° C. at a heating rate of 10° C./min. The polyolefin resin particles of the present invention will be described in detail below.

The peak temperature ($T_1$) of the melting peak on the first heating in the DSC curve obtained by heating from 20° C. to 200° C. at a heating rate of 10° C./min is hereinafter referred to as the first temperature ($T_1$), and the peak temperature ($T_2$) of the melting peak on the second heating in the DSC curve obtained by, subsequent to the first heating, cooling from 200° C. to 20° C. at a cooling rate of 10° C./min, and then heating from 20° C. to 200° C. at a heating rate of 10° C./min is hereinafter referred to as the second temperature ($T_2$).

Polyolefin Resin

The polyolefin resin particles of the present invention are resin particles that contain a polyolefin resin as a major component. Examples of the polyolefin resin include a polyethylene resin and a polypropylene resin. A single kind thereof may be used solely, or a mixture of two or more kinds thereof may be used.

The term "major component" above means that the polyolefin resin particles contains the polyolefin resin in an amount of 50% by mass or more. The content of the polyolefin resin in the polyolefin resin particles is preferably 50% by mass or more, more preferably 75% by mass or more, further preferably 80% by mass or more, and particularly preferably 90% by mass or more.

Examples of the polypropylene resin include a propylene homopolymer and a copolymer with a monomer capable of being copolymerized with propylene. Examples of the monomer capable of being copolymerized with propylene include an α-olefin having from 4 to 10 carbon atoms, such as ethylene, 1-butene, isobutylene, 1-pentene, 3-methyl-1-butene, 1-hexene, 3,4-dimethyl-1-butene, and 3-methyl-1-hexene. The copolymer may be a random copolymer or a block copolymer, and may be not only a two-component copolymer, but also a terpolymer. More preferred examples of the polypropylene resin include a copolymer of propylene and ethylene.

The additional olefin component capable of being copolymerized with propylene in the copolymer may be contained in the polypropylene resin preferably in a proportion of 25% by mass or less, and more preferably 15% by mass or less. The polypropylene resin may be used solely or as a mixture of two or more kinds thereof.

Examples of the polyethylene resin include a resin containing an ethylene component unit in an amount of 50% by mass or more. Examples of the polyethylene resin include high density polyethylene, low density polyethylene, linear low density polyethylene, an ethylene-vinyl acetate copolymer, an ethylene-propylene copolymer, an ethylene-propylene-1-butene copolymer, an ethylene-1-butene copolymer, an ethylene-1-hexene copolymer, an ethylene-4-methyl-1-pentene copolymer, and an ethylene-1-octene copolymer. A single kind of the polyethylene resin may be used solely, or a mixture of two or more kinds thereof may be used.

In the polyolefin resin, a polypropylene resin is preferred since it is particularly excellent in balance between the mechanical strength and the heat resistance.

The polyolefin resin particles may contain an additional thermoplastic resin component other than the polyolefin resin, an elastomer component, and the like, in such a range that does not impair the effects of the present invention. Examples of the additional thermoplastic resin component and the elastomer component include a vinyl acetate resin, a thermoplastic polyester resin, an acrylate ester resin, a methacrylate ester resin, a styrene resin, a polyamide resin, a fluorine resin, ethylene-propylene rubber, ethylene-propylene-diene rubber, ethylene-acrylic rubber, chlorinated polyethylene rubber, and chlorosulfonated polyethylene rubber.

Melting Peak Temperature of Polyolefin Resin Particles

The polyolefin resin particles have such a crystal structure that the peak temperature ($T_1$) of the melting peak on the first heating in the DSC curve obtained by heating the resin particles from 20° C. to 200° C. at a heating rate of 10° C./min is higher by 1.5° C. or more than the peak temperature ($T_2$) of the melting peak on the second heating in the DSC curve obtained by, subsequent to the first heating, cooling from 200° C. to 20° C. at a cooling rate of 10° C./min, and then heating from 20° C. to 200° C. at a heating rate of 10° C./min. The first temperature ($T_1$) is a melting temperature that is derived from melting of the crystal structure of the polyolefin resin particles of the present invention (i.e., the crystal structure that is formed through the isothermal crystallization described later). The second temperature ($T_2$) is a melting temperature that is derived from melting of the crystal structure of the polyolefin resin (i.e., the crystal structure that is inherent to the polyolefin resin). The crystal structure that is inherent to the polyolefin resin is melted by the heat treatment described later, and the polyolefin resin thus melted undergoes isothermal crystallization to form the crystal structure of the polyolefin resin particles of the present invention. The first temperature ($T_1$) and the second temperature ($T_2$) each are a peak temperature of a melting peak that is obtained based on JIS K7121 (1987), and in the case where plural melting peaks are present on the first heating, the peak temperature of the melting peak having the highest peak height based on the high temperature side baseline is designated as the melting point.

In the polyolefin resin particles of the present invention, the first temperature ($T_1$) is higher than the second temperature ($T_2$) by 1.5° C. or more, and preferably by 2° C. or more. The upper limit of the difference between the first temperature ($T_1$) and the second temperature ($T_2$) ($T_1-T_2$) is around 10° C., and preferably 8° C. Expanded polyolefin resin beads having a favorable fine cell structure can be obtained by expanding the polyolefin resin particles having the crystal structure.

Heat Treatment

The polyolefin resin particles of the present invention may be produced by heat-treating preliminary polyolefin resin particles at a temperature that is higher by from 12 to 25° C. than the melting point of the preliminary polyolefin resin particles, and preferably at a temperature that is higher by from 15 to 22° C. than the melting point of the preliminary polyolefin resin particles. According to the procedure, such a crystal structure can be formed in the polyolefin resin particles that has the first temperature ($T_1$) where the first temperature ($T_1$) is higher than the second temperature ($T_2$) by 1.5° C. or more. The preliminary polyolefin resin particles are polyolefin resin particles before being subjected to the heat-treatment. The preliminary polyolefin resin particles may be produced, for example, in such a manner that a molded article in a strand form is produced with commercially available polyolefin resin pellets, and the molded article is then cut or pulverized. The preliminary polyolefin resin particles have the crystal structure that is inherent to the polyolefin resin particles and have a melting temperature at the second temperature ($T_2$).

The polyolefin resin particles preferably have a particle weight of 2,000 μg or less, more preferably 100 μg or less, and further preferably 50 μg or less. When the particle weight of the polyolefin resin particles is in the range, minute expanded olefin resin beads may be obtained. Due to the polyolefin resin particles that have the aforementioned particular crystal structure, expanded polyolefin resin beads having a favorable fine cell structure can be obtained with minute beads having a small particle weight. The lower limit of the particle weight is around $5\times10^{-4}$ μg, preferably 0.2 μg, and more preferably 0.5 μg.

Shape of Polyolefin Resin Particles

The polyolefin resin particles preferably have a ratio of the longer diameter and the shorter diameter (longer diameter/shorter diameter) of from 1 to 1.3. When the ratio of the longer diameter and the shorter diameter (longer diameter/shorter diameter) of the polyolefin resin particles is from 1 to 1.3, expanded olefin resin beads that has a substantially spherical shape (for example, the ratio of the longer diameter and the shorter diameter (longer diameter/shorter diameter) is from 1 to 1.3) may be obtained. Furthermore, the distribution of the foam cells in the expanded olefin resin beads may be uniformized, and the foam cell diameter may also be uniformized.

Expanded Polyolefin Resin Beads

The expanded polyolefin resin beads of the present invention can be obtained by foaming and expanding the polyolefin resin particles of the present invention.

Longer Diameter and Shorter Diameter of Expanded Polyolefin Resin Beads

The expanded polyolefin resin beads of the present invention preferably have a ratio of the longer diameter and the shorter diameter (longer diameter/shorter diameter) of from 1 to 1.3, and more preferably from 1 to 1.1. When the ratio of the longer diameter and the shorter diameter (longer diameter/shorter diameter) of the expanded polyolefin resin beads is from 1 to 1.3, the expanded polyolefin resin beads used in a beads cushion or the like may easily migrate within the beads cushion, whereby the beads cushion can be suitably deformed according to the human body shape, and simultaneously the feeling of the cushion can be enhanced. The longer diameter of the expanded polyolefin resin beads is preferably from 0.05 to 1.6 mm, and more preferably from 0.1 to 0.3 mm. When the longer diameter of the expanded polyolefin resin beads is in the range, the expanded polyolefin resin beads used in a beads cushion can further enhance the comfort of the beads cushion, and simultaneously can be prevented from passing through the fabric, in which the expanded polyolefin resin beads are filled.

Apparent Density

The expanded polyolefin resin beads preferably have an apparent density of from 10 to 300 g/L, and more preferably from 15 to 100 g/L.

Foam Cell Structure

The expanded polyolefin resin beads preferably have a number of foam cells of from 10 to 50, and more preferably from 15 to 40, that cross the straight line passing through the center of the expanded polyolefin resin bead in the longer diameter direction thereof. The expanded polyolefin resin beads preferably have a closed cell ratio of 70% or more, more preferably 80% or more, and further preferably 90% or more. The expanded beads preferably have an average foam cell diameter of 100 μm or less. When the number of foam cells is the certain number or more, and the closed cell ratio is high, the expanded polyolefin resin beads may be excellent in recovery property on repeated compression even through the expanded resin beads have a small particle diameter. In the case where the expanded polyolefin resin beads have a spherical shape (i.e., the longer diameter and the shorter diameter thereof are the same as each other), the straight line passing through the center of the expanded polyolefin resin bead in the longer diameter direction thereof is not particularly limited as far as the straight line passes through the center of the expanded bead. The average foam cell diameter of the expanded polyolefin resin beads can be obtained by dividing the longest diameter by the number of foam cells. The closed cell ratio is a ratio of the volume of the closed cells with respect to the volume of the entire foam cells in the expanded beads, and may be measured with an air pycnometer based on ASTM D2856-70.

Temperature and Calorific Value of Melting Peak of Expanded Polyolefin Resin Beads The expanded polyolefin resin beads have such a crystal structure that shows two melting peaks in a DSC curve obtained by heating the expanded beads from 20° C. to 200° C. at a heating rate of 10° C./min, i.e., a melting peak derived from the crystal structure inherent to the polyolefin resin constituting the expanded beads (i.e., the inherent peak), and a melting peak positioned on the high temperature side of the inherent peak (i.e., the high temperature peak). The high temperature peak is derived from the crystals formed by performing an isothermal crystallization procedure on expanding the polyolefin resin particles. Specifically, in the isothermal crystallization procedure, on heating the resin particles having been dispersed in a dispersion medium within a closed vessel, the heating is terminated at a temperature (which may be hereinafter referred to as Ta) within a range of a temperature that is lower by 15° C. than the melting point (which may be hereinafter referred to as Tm) of the resin particles or more and less than the melting end temperature (which may be hereinafter referred to as Te) where the resin particles are completely melted, and the dispersion medium having the resin particles dispersed therein is retained at the temperature Ta for a sufficient period of time, which is preferably approximately from 10 to 60 minutes. According to the procedure, expanded beads having the aforementioned high temperature peak can be obtained. Thereafter, the temperature is controlled to a temperature (which may be hereinafter referred to as Tb) within a range of from (Tm−5° C.) to (Te+5° C.), and at that temperature, the resin particles are discharged along with the dispersion medium to a low pressure area, thereby expanding the resin particles.

In the present invention, the polyolefin resin particles having the particular crystal structure are used and expanded under the condition where the resin particles have the high temperature peak, thereby providing the expanded beads. The expanded beads have the high temperature peak at a higher temperature side than ordinary expanded polyolefin resin beads obtained by expanding a polyolefin resin that does not have the particular crystal structure through the heat treatment. It is considered that this is because of the formation of the micro lamellar of the purer crystal structure. Consequently, the expanded polyolefin resin beads having a favorable fine cell structure can be obtained irrespective of the small particle diameter.

In the case where the polyolefin resin constituting the expanded beads is a polypropylene resin, the temperature (T) of the high temperature peak of the two melting peaks preferably has a relationship shown by the following expression (1) with respect to the calorific value (ΔH) of the high temperature peak and the temperature (Tm) of the inherent peak. The expanded polyolefin resin beads that satisfy the relationship may have a particularly favorable fine cell structure with a large number of foam cells and a high closed cell ratio even though the expanded polyolefin resin beads have a small particle diameter.

$$T \geq Tm+19-0.27\times\Delta H \quad (1)$$

Article

The article of the present invention contains the expanded polyolefin resin beads of the present invention filled therein. Examples of the article include a body pillow, a bottom mattress, a bed mattress, a comforter, a sound sleep pillow, an automotive interior material, a foot supporter, a personal floatation device, winter clothes, and furniture. The application of the expanded polyolefin resin beads of the present invention to these articles may improve the comfort of the articles. Furthermore, the articles may be prevented from suffering the settling occurring on using the articles and the volume shrinkage under a high temperature environment.

Method for Producing Expanded Polyolefin Resin Beads

The method for producing expanded polyolefin resin beads of the present invention includes: a step (A) of preparing preliminary resin particles containing a polyolefin resin; a step (B) of heat-treating the preliminary resin particles to produce resin particles; and a step (C) of expanding the resin particles.

Step (A)

In the step (A), preliminary resin particles of a polyolefin resin are prepared. The preliminary resin particles to be prepared can be produced, for example, in the following manner. Pellets of a polyolefin resin and a prescribed additive are placed in an extruder, and an extruded product of the polyolefin resin in a strand form is produced. The extruded product in a strand form thus produced is cut, and depending on necessity, the extruded product in a strand form thus cut is further pulverized, so as to produce the preliminary resin particles of the polyolefin resin. Examples of the pulverizer used for pulverizing the extruded product in a strand form thus cut include a ball mill, a bead mill, a colloid mill, a conical mill, a disk mill, an edge mill, a grain mill, a hammer mill, a mortar, a pellet mill, a VSI mill, a wiley mill, a waterwheel mill, a roller mill, and a jet mill. For facilitating the pulverization of the extruded product in a strand form thus cut, the extruded product in a strand form thus cut may be cooled by immersing in liquid nitrogen or the like before the pulverization. For uniformizing the size of the preliminary resin particles to a size within a particular range, the preliminary resin particles may be classified with a classifier.

Step (B)

In the step (B), the preliminary resin particles thus prepared are heat-treated, for example, in the following manner, so as to produce polyolefin resin particles. The preliminary resin particles are placed in a vessel having a medium, such as water, placed therein, and the preliminary resin particles are heat-treated while agitating the preliminary resin particles in the medium. The temperature for the heat-treatment is a temperature that is higher by from 12 to 25° C. than a melting point of the preliminary resin particles, and preferably a temperature that is higher by from 15 to 22° C. than a melting point of the preliminary resin particles. The heat treatment is preferably performed for from 1 to 120 minutes, and preferably from 15 to 60 minutes. The resin particles thus produced through the step (B) are the polyolefin resin particles of the present invention.

Step (C)

As a method of expanding the resin particles in the step (C), for example, a blowing agent, the resin particles, an aqueous medium, and a dispersant are placed in a closed vessel. Subsequently, the mixture is heated in the closed vessel to a temperature of the softening point of the resin particles or higher, so as to impregnate the resin particles with the blowing agent, and by retaining the aforementioned temperature range, the polyolefin resin is subjected to isothermal crystallization to form a crystal structure showing the high temperature peak. The resin particles containing the blowing agent are then discharged along with the aqueous medium to a low pressure area, thereby expanding the resin particles.

The formation of the high temperature peak of the expanded beads and the calorific value of the high temperature peak depend mainly on the aforementioned temperature Ta, the retention time at the temperature Ta, the aforementioned temperature Tb, and the heating rate within a range of from (Tm−15° C.) to (Te+5° C.), of the resin particles in the production of the expanded beads. The calorific value of the high temperature peak of the expanded beads tends to be larger when the temperatures Ta and Tb each are lower within the temperature ranges, the retention time within a range of (Tm−15° C.) or more and less than Te is longer, and the heating rate within a range of (Tm−15° C.) or more and less than Te is smaller. The heating rage is generally selected from a range of from 0.5 to 5° C./min. The calorific value of the high temperature peak of the expanded beads tends to be smaller when the temperatures Ta and Tb each are higher within the temperature ranges, the retention time within a range of (Tm−15° C.) or more and less than Te is shorter, the heating rate within a range of (Tm−15° C.) or more and less than Te is larger, and the heating rage within a range of from Te to (Te+5° C.) is smaller.

Examples of the blowing agent include an inorganic physical blowing agent, such as nitrogen, oxygen, air, carbon dioxide, and water. The aqueous medium used may be generally water. However, it is not limited to water and may be a solvent that does not dissolve the resin particles. Examples of the dispersion medium other than water include ethylene glycol, glycerin, methanol, and ethanol. Examples of the dispersant include aluminum oxide and an aluminosilicate salt. The pressure inside the closed vessel, i.e., the pressure (gauge pressure) of the internal space of the vessel, may be, for example, from 0.6 to 6.0 MPa.

EXAMPLE

The present invention will be described in more detail with reference to examples below, but the present invention is not limited to the examples.

Evaluation

The resin particles and the expanded beads produced in Examples and Comparative Examples were subjected to the following evaluation.

DSC

The resin particles and the expanded beads produced in Examples and Comparative Examples were subjected to differential scanning calorimetry (DSC). The measurement device used was a heat flux differential scanning calorimeter (Model DSCQ 1000, produced by TA Instruments, Ltd.).

For the resin particles, approximately from 1 to 3 mg of the specimen (resin particles) was placed in the measurement device, and according to JIS K7121 (1987), the specimen was heated from 20° C. to 200° C. at a heating rate of 10° C./min (i.e., the first heating), then cooled from 200° C. to 20° C. at a cooling rate of 10° C./min, and then further heated from 20° C. to 200° C. at a heating rate of 10° C./min (i.e., the second heating), so as to provide a DSC curve. The measurement was performed five times using different specimens. The arithmetic average value of the peak temperatures of the melting peaks on the first heating was designated as $T_1$ (° C.), and the arithmetic average value of the peak temperatures of the melting peaks on the second heating was designated as $T_2$ (° C.).

For the expanded beads, approximately from 1 to 3 mg of the specimen (expanded beads) was placed in the measurement device, and was measured from 20° C. to 200° C. at a heating rate of 10° C./min. The measurement was performed five times using different specimens. The arithmetic average value of the peak temperatures of the melting peaks on the low temperature side (i.e., the inherent peaks) was designated as Tm (° C.), and the arithmetic average value of the peak temperatures of the melting peaks on the high temperature side (i.e., the high temperature peaks) was designated as T (° C.). In the DSC curves, a straight line was drawn between the point corresponding to the melting end temperature of the high temperature peak and the point corresponding to 80° C., then a straight line perpendicular to the abscissa for the temperature was drawn from the previous straight line to the valley between the temperature (Tm) of the inherent peak and the temperature (T) of the high temperature peak, the calorific value of the melting peak on the high temperature side was calculated from the area surrounded by the straight line and the base line, and the resulting values were arithmetically averaged to provide ΔH (J/g).

SEM Observation

The expanded beads were observed with a scanning electron microscope, and the longer diameter and the ratio of the longer diameter and the shorter diameter (longer diameter/shorter diameter) of the expanded beads were measured. 50 expanded beads were observed for one Example or Comparative Example. The average values of the longer diameters and the ratios of the longer diameter and the shorter diameter (longer diameter/shorter diameter) of the expanded beads thus measured were designated as the longer diameter and the ratio of the longer diameter and the shorter diameter (longer diameter/shorter diameter) respectively of the expanded beads of Example or Comparative Example. The expanded bead was cut into two approximately equal parts in the longer diameter direction of the expanded bead, the cross section of the expanded bead was observed with a scanning electron microscope, and the number of foam cells was measured that crossed the straight line passing through the center of the expanded bead in the longer diameter direction of the expanded bead. 50 expanded beads were observed for one Example or Comparative Example, and the average value of the numbers of the foam cells was designated as the number of foam cells that crossed the center of the expanded beads of Example or Comparative Example.

Apparent Density

Approximately 500 cm³ of the expanded beads having been allowed to stand under a condition of 23° C., a relative humidity of 50%, and 1 atm, for 2 days were measured for weight (g), the expanded beads were immersed with a metal mesh in a 1 L measuring cylinder having 300 cc of water at 23° C. placed therein, the volume V (cm³) of the expanded beads was obtained from the elevation of the water surface with the scale, and the value obtained by dividing the weight W of the expanded beads by the volume V thereof (W/V) was converted for unit to g/L, which was designated as the apparent density of the expanded beads.

The closed cell ratio of the expanded beads was obtained in the following manner. The expanded beads were conditioned by allowing to stand under a condition of 23° C., a relative humidity of 50%, and 1 atm, for 2 days in a thermostat chamber. In the thermostat chamber, the expanded beads were measured for the true volume (i.e., the sum of the volume of the resin constituting the expanded beads and the entire cell volume of the closed foam cells within the expanded beads) Vx with Air Pycnometer 930, produced by Toshiba Beckman Co., Ltd. according to the procedure C described in ASTM D2856-70, the closed cell ratio was calculated by the following expression (2), and the average value of 5 specimens was designated as the closed cell ratio.

$$\text{Closed cell ratio } (\%)=(Vx-W/\rho)\times 100/(Va-W/\rho) \quad (2)$$

Vx: the true volume of expanded beads measured by the aforementioned method (cm³)
Va: the apparent volume of the expanded beads (cm³)
W: the weight of the specimen of the expanded beads to be measured (g)
ρ: the density of the resin constituting the expanded beads (g/cm³)

Texture Test at Room Temperature

A sewn product in a bag form (capacity: 1 L) having a dimension of 10 cm×20 cm was produced by using a spandex fabric formed of 15% by mass of a urethane resin and 85% by mass of a nylon resin, and approximately 1.5 L in terms of bulk volume of the expanded beads were filled therein. The sewn product in a bag form having the expanded beads filled therein was subjected to a touch test by test subjects, and the texture of the sewn product in a bag form having the expanded beads filled therein was measured.

Settling Test

1 L of the expanded beads to be evaluated were placed in a rigid vessel having an opening area of 100 cm², and repeatedly compressed with a rigid jig having a cross sectional area (pressing area) of 25 cm² having an apical portion with a fillet radius of 5 mm, which was inserted by 50 mm from the gauge line of the expanded beads of the vessel having the expanded beads placed therein (which was 50% compression in terms of apparent volume). The compression speed was controlled to from 0.1 Hz to 1 Hz.

Evaluation good: The volume reduction after 1,000 repetitions of compression was less than 10%.

poor: The volume reduction after 100 repetitions of compression was less than 10%, and the volume reduction after 1,000 repetitions of compression was 10% or more.

bad: The volume reduction after 100 repetitions of compression was 10% or more.

Heat Shrinkage Test

1 L of the expanded beads were allowed to stand in a circulating hot air oven at 100° C., and the temporal change in volume was measured.

Evaluation good: The volume change after 200 hours was less than 10%.

poor: The volume change after 5 hours was less than 10%, and the volume change after 200 hours was 10% or more.

bad: The volume change after 5 hours was 10% or more.

Production of Resin Particles and Expanded Beads by Examples and Comparative Examples Examples and Comparative Examples will be described below.

Example 1

Pellets of an ethylene-propylene copolymer (polypropylene resin) having a melting point of 142° C. and a melt mass flow rate (MFR) of 5 g/10 min and zinc borate in an amount of 500 ppm based on the mass of the pellets were placed in an extruder (inner diameter: 40 mm) set at a temperature of 200° C., and melt-kneaded, and the melt-kneaded product was extruded to produce an extruded product in a strand form having a diameter of 1.25 mm. The extruded product in a strand form was cut in a length providing a length/diameter ratio of 2 (longer diameter: 2.5 mm) to produce mini-pellets. The average mass of the minute pellet was 1.0 mg per one pellet.

The minute pellets were exposed to liquid nitrogen, and then pulverized by passing through a pulverizer (Spiral Mill SP-420, a trade name, produced by Seishin Enterprise Co., Ltd.) having been sufficiently cooled, so as to provide preliminary resin particles. The pulverization condition was a clearance of 0.5 mm, a rotation number of 5,000 rpm, and a processed amount of 7 kg/hour. Thereafter, the preliminary resin particles were classified into beads on a 580 μm mesh sieve (which may be hereinafter referred to as ON) and beads below the sieve (which may be hereinafter referred to as PASS). The preliminary beads ON had an average weight of 180 μg, and the preliminary beads PASS had an average weight of 30 μg.

600 g of the preliminary resin particles ON, 3,000 cc of water, 6 g of kaolin, 0.6 g of a surfactant (Neogen S20, a trade name, produced by Dai-ichi Kogyo Seiyaku Co., Ltd.), and 0.15 g of aluminum sulfate were placed in a 5 L autoclave, heated to 150° C. at a heating rate of approximately 2.5° C./min under agitation at 200 rpm, and retained at 150° C. for 5 minutes. Thereafter, heating by 5° C. and retention for 5 minutes were repeated, and at the time when the temperature reached 165° C. (which was higher than the melting point by 23° C.), the temperature was retained at 165° C. for 1 hour. After retaining for 1 hour, the contents in the autoclave were radiationally cooled, and at the time when the temperature reached 60° C., the contents were taken out. The contents were dried at 60° C. for 24 hours with a dryer to provide resin particles of Example 1.

Subsequently, 300 g of the resin particles, 3,700 cc of water, 6 g of kaolin, 0.6 g of a surfactant (Neogen S20, a trade name, produced by Dai-ichi Kogyo Seiyaku Co., Ltd.), 0.15 g of aluminum sulfate, and 50 g of a blowing agent (dry ice) were placed in a 5 L autoclave, heated to 145° C. (which was lower than the expanding temperature by 5° C.) at a heating rate of approximately 2.5° C./min under agitation at 200 rpm, and retained at 145° C. for 15 minutes. Thereafter, the contents were heated to 150° C. (expanding temperature) and retained at 150° C. for 15 minutes. After retaining for 15 minutes, the resin particles were discharged to the air by opening one end of the autoclave, so as to expand the resin particles, thereby providing expanded beads of Example 1.

Example 2

Resin particles and expanded beads of Example 2 were obtained in the same manner as in Example 1 except that the preliminary resin particles PASS were used instead of the preliminary resin particles ON.

Example 3

Resin particles and expanded beads of Example 3 were obtained in the same manner as in Example 1 except that the preliminary resin particles PASS were used instead of the preliminary resin particles ON, and the expanding temperature was changed from 150° C. to 148° C.

Comparative Example 1

Resin particles and expanded beads of Comparative Example 1 were obtained in the same manner as in Example 1 except that the mini-pellets were directly used as the resin particles, and the mini-pellets were expanded, and that the expanding temperature was changed from 150° C. to 148° C.

Comparative Example 2

Resin particles and expanded beads of Comparative Example 2 were obtained in the same manner as in Example 1 except that the miniature pellets were directly used as the resin particles, and the mini-pellets were expanded.

Comparative Example 3

Resin particles and expanded beads of Comparative Example 3 were obtained in the same manner as in Example 1 except that the preliminary resin particles PASS were used instead of the preliminary resin particles ON, the preliminary resin particles were directly used as the resin particles, i.e., the preliminary resin particles were not heat-treated, and that the expanding temperature was changed from 150° C. to 148° C.

Comparative Example 4

Expanded beads were obtained by expanding commercially available expandable polystyrene resin particles (Model JK550, produced by JSP Corporation).

Figure 2:
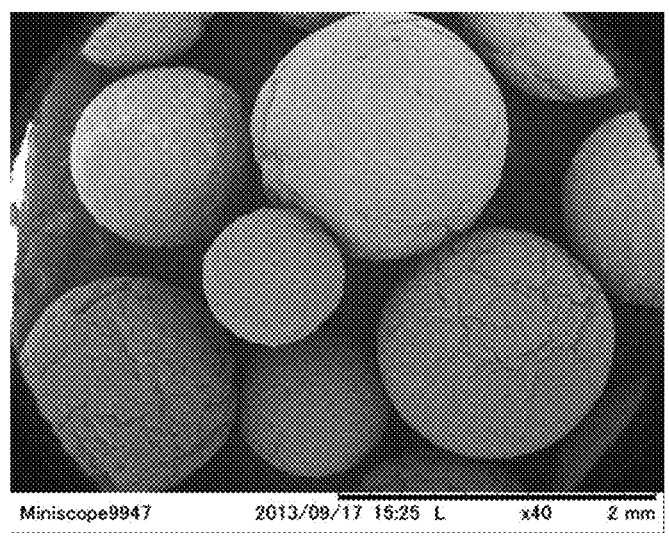
FIG. 2 is a scanning electron micrograph of expanded beads of Example 1.
Figure 3:
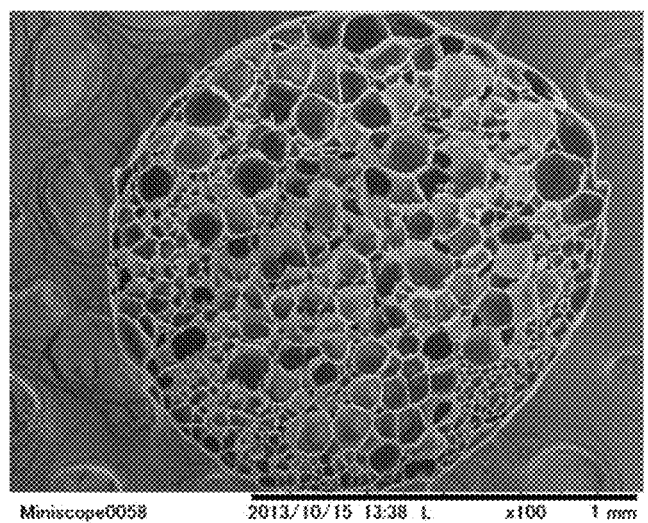
FIG. 3 is an electron micrograph of a cross section of expanded beads of Example 1.
Figure 4:
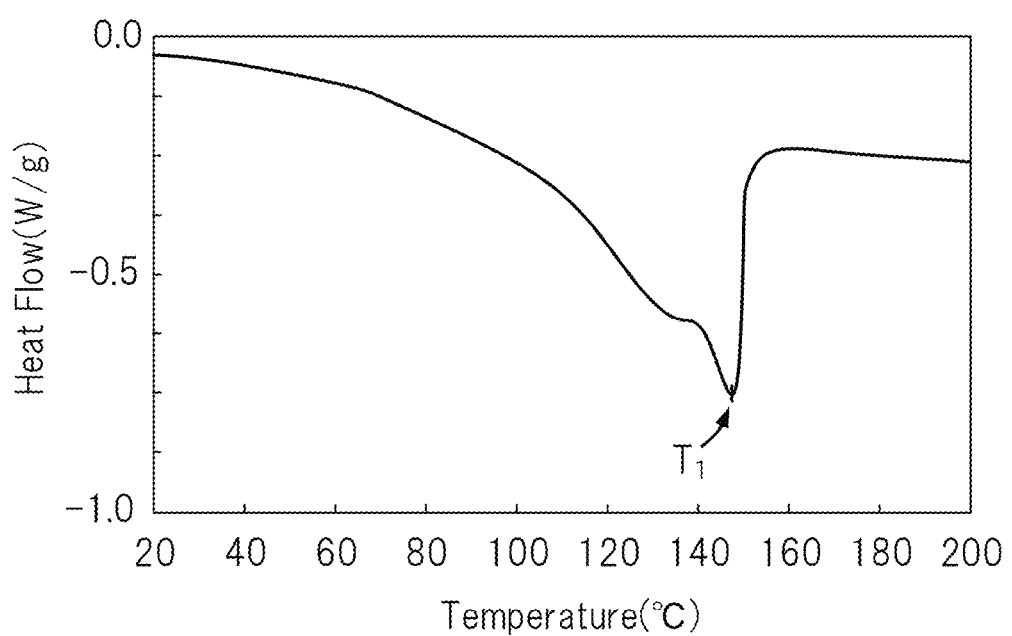
FIG. 4 is a DSC curve on the first heating of resin particles of Example 1.
Figure 5:
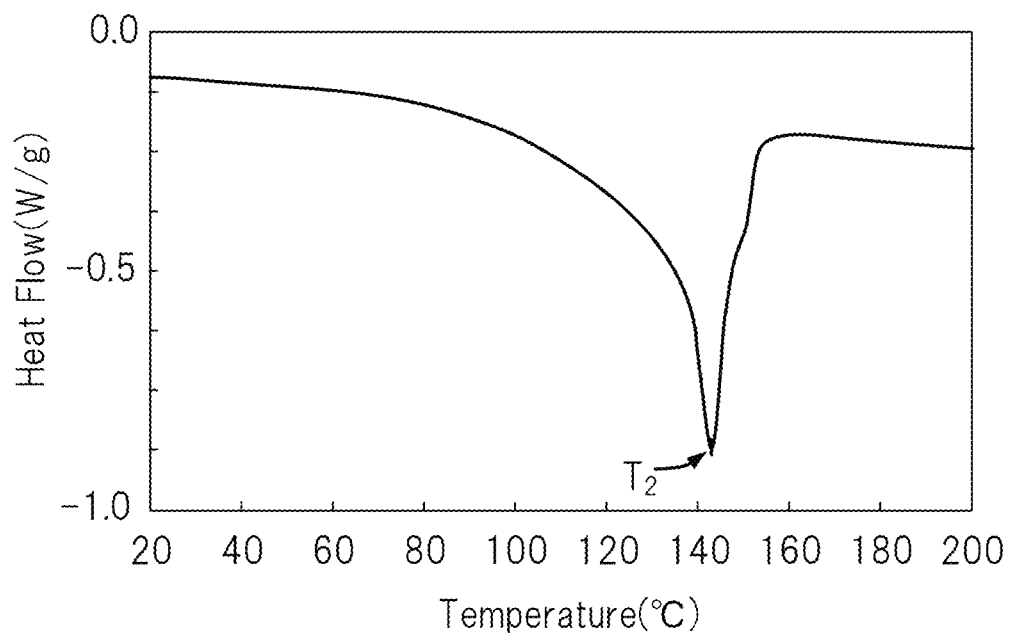
FIG. 5 is a DSC curve on the second heating of resin particles of Example 1.

Among the resin particles thus produced according to Examples and Comparative Examples, the scanning electron micrograph of the resin particles of Example 1 is shown in FIG. 1. The scanning electron micrograph of the expanded beads of Example 1 is shown in FIG. 2, and the electron micrograph of the cross section of the expanded beads of Example 1 is shown in FIG. 3. The DSC curves of the resin particles of Example 1 are shown in FIGS. 4 and 5. FIG. 4 shows the DSC curve obtained by heating from 20° C. to 200° C. at a heating rate of 10° C./min, in which $T_1$ is the temperature of the melting peak. FIG. 5 shows the DSC curve obtained by heating from 20° C. to 200° C. at a heating rate of 10° C./min, cooling from 200° C. to 20° C. at a cooling rate of 10° C./min, and then further heating from 20° C. to 200° C. at a heating rate of 10° C./min, in which $T_2$ is the temperature of the melting peak.

Figure 6:
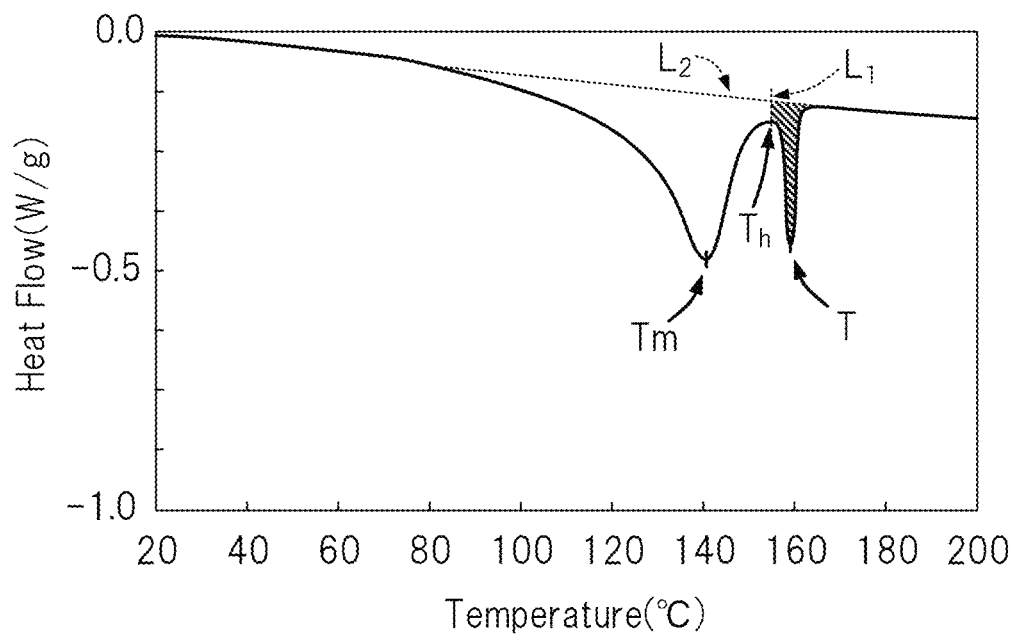
FIG. 6 is a DSC curve of expanded beads of Example 1.

Among the DSC curves of the expanded beads of Examples and Comparative Examples, the DSC curve of the expanded beads of Example 1 is shown in FIG. 6. FIG. 6 shows the DSC curve obtained by heating from 20° C. to 200° C. at a heating rate of 10° C./min. T in the figure is the temperature of the high temperature peak among the two melting peaks, and Tm is the temperature of the inherent peak among them. In the DSC curves, furthermore, a straight line was drawn between the point corresponding to the melting end temperature of the high temperature peak and the point corresponding to 80° C., then a straight line L1 perpendicular to the abscissa for the temperature was drawn from the previous straight line to the valley ($T_h$) between the temperature (Tm) of the inherent peak and the temperature (T) of the high temperature peak, and the calorific value of the melting peak on the high temperature side was calculated from the area surrounded by the straight line L1 and the base line L2 and designated as ΔH (J/g).

Evaluation Results

The evaluation results of the resin particles and the expanded beads of Examples 1 to 3 and Comparative Examples 1 to 4 are shown in Table 1 below. The term "yes" for the freeze pulverization means that the cooled miniature pellets are pulverized, and the term "no" therefor means that the cooled miniature pellets are not pulverized.

As apparent from the comparison between the evaluation results of Examples and the evaluation results of Comparative Examples, the expanded beads obtained by expanding the resin particles of the present invention and the expanded beads of the present invention are prevented from suffering volume shrinkage under a high temperature environment, and also prevented from suffering settling. Furthermore, the expanded beads obtained by expanding the resin particles of the present invention and the expanded beads of the present invention can provide a beads cushion with good texture.

TABLE 1

Evaluation results of Examples and Comparative Examples

|  |  |  | Example 1 | Example 2 | Example 3 | Comparative Example 1 | Comparative Example 2 | Comparative Example 3 | Comparative Example 4 |
|---|---|---|---|---|---|---|---|---|---|
|  | Resin |  | ethylene-propylene random copolymer (polypropylene resin) | | | | | | polystyrene |
| Resin particles | Melting point of resin | ° C. | 142 | 142 | 142 | 142 | 142 | 142 | — |
|  | Freeze pulverization |  | yes | yes | yes | no | no | yes |  |
|  | 580 μm classification |  | on | pass | pass | — | — | pass |  |
|  | Heat treatment time | hour | 1 | 1 | 1 | — | — | — |  |
|  | Heat treatment temperature | ° C. | 165 | 165 | 165 | — | — | — |  |
|  | Average weight | μg | 180 | 30 | 30 | 3,000 | 3,000 | 3,000 |  |
|  | Temperature ($T_1$) of melting peak | ° C. | 147.7 | 145.1 | 145.1 | 142.4 | 142.4 | 143.0 |  |
|  | Temperature ($T_2$) of melting peak | ° C. | 142.4 | 142.4 | 142.4 | 142.4 | 142.4 | 142.4 |  |
|  | $T_1 - T_2$ | ° C. | 5.3 | 2.7 | 2.7 | 0 | 0 | 0.6 |  |
| Expanded beads | Expanding temperature | ° C. | 150 | 150 | 148 | 148 | 150 | 148 | — |
|  | Blowing agent |  | $CO_2$ | $CO_2$ | $CO_2$ | $CO_2$ | $CO_2$ | $CO_2$ |  |
|  | Amount of blowing agent | g | 50 | 50 | 50 | 50 | 40 | 50 |  |
|  | Longer diameter/shorter diameter ratio |  | 1.0 | 1.1 | 1.0 | 1.2 | 1.2 | 1.4 | 1.0 |

TABLE 1-continued

Evaluation results of Examples and Comparative Examples

| Resin | | Example 1 | Example 2 | Example 3 | Comparative Example 1 | Comparative Example 2 | Comparative Example 3 | Comparative Example 4 |
|---|---|---|---|---|---|---|---|---|
| | | ethylene-propylene random copolymer | | | (polypropylene resin) | | | polystyrene |
| Longer diameter | mm | 1.3 | 1.1 | 0.9 | 2.9 | 3.2 | 1.0 | 1.1 |
| Number of foam cells | | 16 | 31 | 57 | 26 | 18 | 10 | 35 |
| Apparent density | g/L | 57 | 42 | 65 | 45 | 40 | 225 | 27 |
| Temperature (Tm) of melting peak on low temperature side | °C. | 140.6 | 140.6 | 139.5 | 140.4 | 140.5 | 139.3 | — |
| Calorific value (ΔH) of melting peak on high temperature side | J/g | 8.2 | 6.2 | 15.3 | 13.9 | 8.2 | 14.7 | |
| Temperature (T) of melting peak on high temperature side | °C. | 159.2 | 161.2 | 156.9 | 156.9 | 158.4 | 156.6 | |
| $T_m + 19 - 0.27 \times$ (calculated value of ΔH) | °C. | 158.7 | 159.3 | 156.9 | 158.7 | 158.7 | 157.0 | |
| Diameter of foam cell | μm | 72 | 43 | 22 | 112 | 180 | 103 | 32 |
| Closed cell ratio | % | 77 | 99 | 90 | 99 | 92 | 63 | 68 |
| Texture at room temperature | | good | good | good | bad | bad | good | good |
| Settling | | good | good | good | good | good | poor | bad |
| Heat shrinkage | | good | good | good | good | good | good | bad |

The invention claimed is:

1. A method for producing expanded polyolefin resin beads, comprising:
a step of preparing preliminary resin particles containing a polyolefin resin having a particle weight of $5 \times 10^{-4}$ μg or more and 50 μg or less;
a step of heat-treating the preliminary resin particles at a temperature that is higher by from 12 to 25° C. than a melting point of the preliminary resin particles, so as to produce resin particles having a peak temperature ($T_1$) of a melting peak on first heating in a DSC curve obtained by heating the resin particles from 20° C. to 200° C. at a heating rate of 10° C./min that is higher by from 1.5 to 10° C. than a peak temperature ($T_2$) of a melting peak on second heating in a DSC curve obtained by, subsequent to the first heating, cooling the resin particles from 200° C. to 20° C. at a cooling rate of 10° C./min, and then heating the resin particles from 20° C. to 200° C. at a heating rate of 10° C./min (heat-treating step);
a step of dispersing the resin particles in a dispersion medium within a closed vessel (dispersing step);
a step of impregnating the resin particles with an blowing agent at a temperature of the softening point of the resin particles or higher within a closed vessel (blowing agent impregnating step);
a step of heating the dispersion medium having the resin particles dispersed therein to a temperature within a range of a temperature that is lower by 15° C. than a melting point (Tm) of the resin particles or more and less than a melting end temperature (Te) where the resin particles are completely melted, and retaining at the temperature for from 10 to 60 minutes (retaining step); and
a step of, after the retaining step, controlling the temperature of the dispersion medium to a temperature within a range of from (Tm−5° C.) to (Te+5° C.), and at that temperature, discharging the resin particles containing the blowing agent from the vessel to a low pressure area, thereby expanding the resin particles, so as to provide expanded beads having two melting peaks in a DSC curve obtained by heating the expanded beads from 20° C. to 200° C. at a heating rate of 10° C./min (expanding step).

2. The method for producing expanded polyolefin resin beads according to claim 1, wherein the beads have an apparent density of from 10 to 300 g/L, a number of foam cells of from 10 to 50 that cross a straight line passing through a center of the resin bead in a longer diameter direction thereof, an average foam cell diameter of 100 μm or less, and a closed cell ratio of 70% or more.

3. Expanded polyolefin resin beads comprising polyolefin resin particles having been expanded, having
two melting peaks in a DSC curve obtained by heating the expanded beads from 20° C. to 200° C. at a heating rate of 10° C./min,
a particle weight of the expanded beads of $5 \times 10^{-4}$ μg or more and 50 μg or less,
an apparent density of from 10 to 300 g/L,
a number of foam cells of from 10 to 50 that cross a straight line passing through a center of the expanded polyolefin resin bead in a longer diameter direction thereof, an average foam cell diameter of 100 μm or less, and a closed cell ratio of 70% or more.

4. The expanded polyolefin resin beads according to the claim 3, wherein a polyolefin resin constituting the expanded beads is a polypropylene resin, and a peak temperature (T) of the high temperature side melting peak of the two melting peaks in the DSC curve has a relationship shown by the following expression (2) with respect to a calorific value (ΔH) of the high temperature side melting peak and a peak temperature (Tm) of the low temperature side melting peak:

$$T \geq Tm + 19 - 0.27 \times \Delta H \qquad (2).$$

5. An article comprising the expanded polyolefin resin beads according to claim 3 filled therein.

* * * * *